July 24, 1951  C. M. GOODSPEED  2,561,854
GROUND LEVELING DEVICE
Filed Nov. 29, 1948
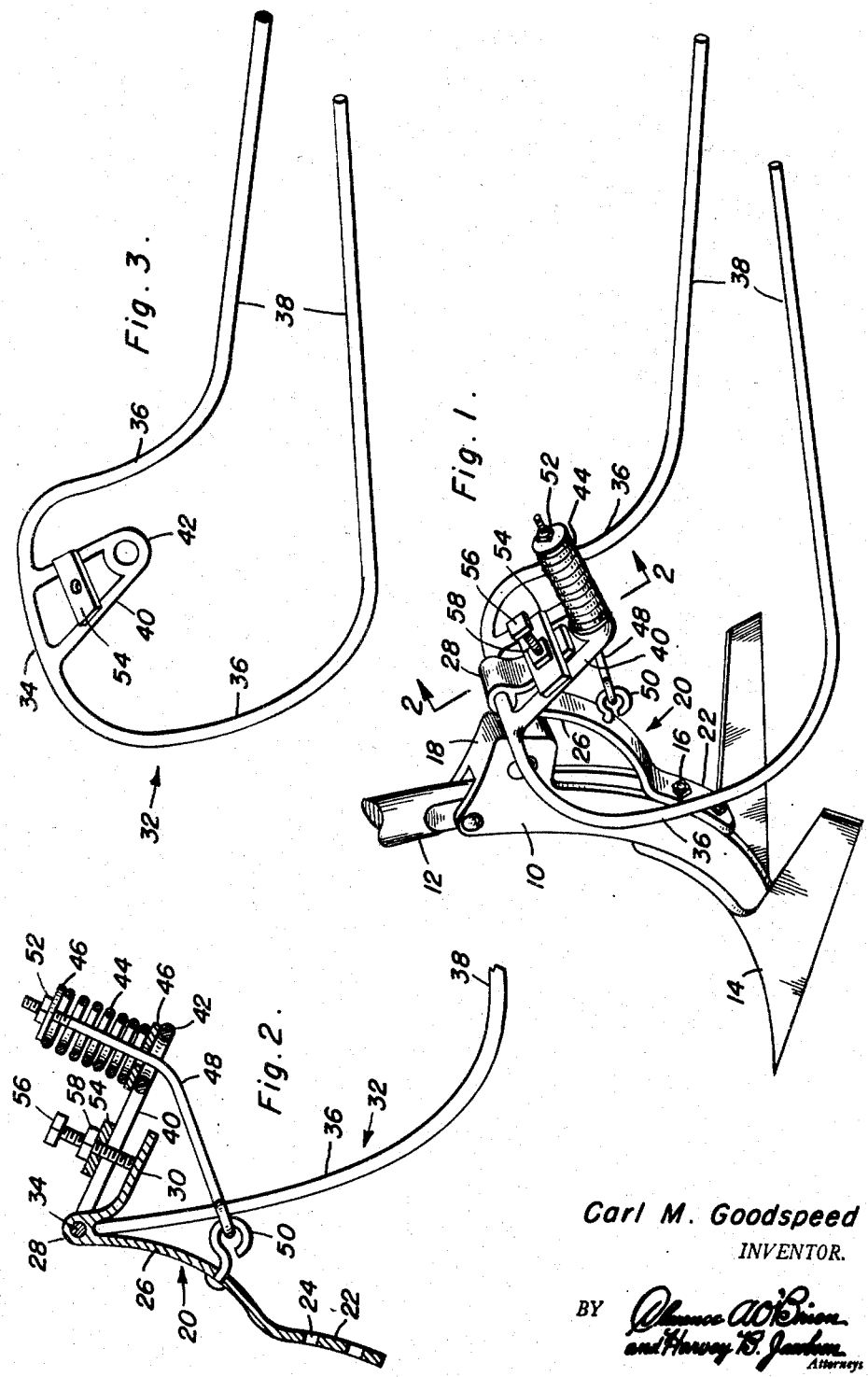
Carl M. Goodspeed
INVENTOR.
BY Patented July 24, 1951

2,561,854

UNITED STATES PATENT OFFICE 2,561,854

GROUND LEVELING DEVICE

Carl M. Goodspeed, Fort Dodge, Iowa

Application November 29, 1948, Serial No. 62,556

4 Claims. (Cl. 97—56)

This invention relates generally to agricultural implements and more particularly to an attachment for a cultivator securable to a cultivator shank behind the plow or shovel member and having rearwardly extending arms constituting ground leveling members.

A primary object of this invention is to provide means to eliminate the shovel tracks or furrows and to leave the cultivated ground level.

Another object of this invention, closely allied to the preceding object, is to eliminate the chief cause of tractor bouncing when the field is being cross-cultivated, since the furrows behind the shovel are filled in by this attachment, and the steering of tractors during subsequent operations on the soil is facilitated.

Another important object of this invention is to increase the mulching of the soil by the implement whereon this attachment is used, thus generally improving the cultivation of the soil and aiding in the conservation of moisture.

Another object of this invention is to provide an attachment of this type which can be adjusted so that the ground leveling arms are pressed downwardly as desired, and the device also includes means to limit the downward movement of the arms relative to the shovel behind which the attachment is secured.

Still another object of this invention is to provide an attachment which is very easily mounted on and removed from several different types of implements, although the device is primarily designed for use with a cultivator having a plurality of shovels, the attachment being secured to the rearmost, or the rearmost row, of these shovels.

And a last object to be specifically mentioned is to provide an attachment of the character mentioned above which is relatively inexpensive and practicable to manufacture, which is simple to use and to adjust, and which will give generally efficient and durable service.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application, and in which:

Figure 1 is a three dimensional view of this attachment secured in operative position on a cultivator shank carrying a shovel;

Figure 2 is a vertical sectional view, taken substantially upon the line 2—2 of Figure 1; and Figure 3 is a three dimensional view of the part hereinafter referred to as the sweep.

Similar characters of reference designate similar or identical elements throughout the specification and throughout the different views in the drawings.

Referring now to the drawings in detail, the environment wherewith this invention is adapted to be used will include a cultivator shank 10 carried by a depending member 12 of a cultivator implement, and carrying a shovel 14 which is secured to the shank 10 by one or more bolts 16. The shank 10 will in most cases have a rearwardly extending knob portion 18. The above mentioned elements being all of conventional character and substantially unaltered by the use therewith of the instant invention.

The subject matter of this application includes an inflexible strap 20 having a lower portion 22 apertured as at 24 to receive the attaching bolts 16 already mentioned as employed to fasten the shovel 14 on the shank 10. The strap also includes an arcuate portion 26 which is configurated to avoid the knob portion 18 of the shank 10, and which terminates at its top in a sleeve bearing 28. The strap also includes a rearwardly extending portion 30 for a purpose to be explained hereinafter.

A sweep, generally indicated by the numeral 32, is comprised of a generally U-shaped member which will ordinarily be constructed from bar stock, the bight portion 34 thereof being journaled at its center in the sleeve bearing 28, so that the sweep can pivot about a horizontal axis. The arms of the sweep 32 curve downwardly and rearwardly as at 36, and the main rearwardly extending portions 38 comprise soil leveling arms. It should be noted that the arms 38 converge slightly toward the rear.

The bight portion 34 has integrally secured thereto a rearwardly extending lug 40 which may be comprised of two bars with an eye member 42 carried on the rear ends of these bars. A helical spring 44 is compressed between a pair of washers 46, one of which rests on the eye member 42 and the other of which is carried by a link 48 which is pivotally secured to the strap 20 as by means of an eye member 50, while the other end of the link is threaded to receive an adjusting nut 52 which bears against the washer 46 at the end of the spring 44 remote from the eye member 42. The link member 48 will ordinarily necessarily be bent intermediate its length, as clearly indicated in Figure 2. This construction provides for a constant biasing of the sweep to pivot downwardly with reference to the strap 20, the adjustment of the biasing action being easily and accurately accomplished by adjusting the nut 52 on the upper threaded end of the link 48.

Means to limit the downward movement of the sweep includes the rearwardly extending portion 30 of the strap 20, a plate 54 rigidly mounted on the lug 40, and a large set screw 56. The plate 54 is threaded to coact with the set screw 56 and the latter has a lock nut 58 which may be turned down tightly upon the plate 54 after adjustment has been made.

The operation of this invention will be clearly understood from a consideration of the foregoing description of the mechanical details thereof, taken in connection with the drawing and with the foregoing recitation of the objects sought to be achieved by this invention. It will be clear that all of these objects are amply achieved by this invention, and further description appears unnecessary.

Obviously, many minor variations from the embodiment described herein and illustrated in the drawing may be resorted to without departure from the spirit of this invention, and the scope thereof should be determined only as limited by a proper interpretation of the terms used in the subjoined claims.

Having described the invention, what is claimed as new is:

1. An attachment for a cultivator having a shank to support a shovel, comprising a strap rigidly securable to a lower portion of the rear side of a cultivator shank and extending upwardly, a rearwardly extending portion on the upper end portion of the strap, a generally U-shaped sweep having a bight portion pivoted on said rearwardly extending portion of the strap for movement about a horizontal axis and having arms extending rearwardly and constituting ground leveling members, and means to bias said sweep so that said arms are urged downwardly comprising a rearwardly extending lug on said bight portion, a spring operatively connected to said lug and an intermediate portion of said strap, set screw means operatively associated with said rearwardly extending portion of the strap and said lug comprising adjustable stop means to limit the downward pivotal movement of the sweep.

2. An attachment for a cultivator having a shank to support a shovel, comprising a strap rigidly securable to the rear side of a cultivator shank, a generally U-shaped sweep having a bight portion pivoted on said strap for movement about a horizontal axis and having arms extending rearwardly and constituting ground leveling members, and means to bias said sweep so that said arms are urged downwardly comprising a rearwardly extending lug on said bight portion, a spring connected to said lug and said strap, and adjustable means to limit the downward movement of said arms relative to said strap.

3. An attachment for a cultivator having a shank to support a shovel, comprising a strap rigidly securable to the rear side of a cultivator shank, a generally U-shaped sweep having a bight portion pivoted on said strap for movement about a horizontal axis and having arms extending rearwardly and constituting ground leveling members, and means to bias said sweep so that said arms are urged downwardly comprising a rearwardly extending lug on said bight portion, a spring connected to said lug and said strap, and adjustable means to limit the downward movement of said arms relative to said strap comprising a rearwardly extending portion of said strap and a set screw adjustable in said lug and engaging said extending portion.

4. An attachment for a cultivator having a shank to support a shovel, comprising a strap rigidly securable to the rear side of a cultivator shank, a generally U-shaped sweep having a bight portion pivoted on said strap for movement about a horizontal axis and having arms extending rearwardly and constituting ground leveling members, and means to bias said sweep so that said arms are urged downwardly comprising a rearwardly extending lug on said bight portion, an elongated inflexible link rod pivoted to an intermediate portion of the strap and extending rearwardly and upwardly from hte strap through said bight portion, a coiled spring arranged coaxially of said link rod and compressed between an upper end portion of the link rod and the upper surface of said lug, and means to limit the downward movement of said arms relative to said strap.

CARL M. GOODSPEED.

REFERENCES CITED

The following references are of record in the file of this patent:

UNITED STATES PATENTS

| Number | Name | Date |
|---|---|---|
| 593,493 | Powell | Nov. 9, 1897 |
| 738,364 | Simonds et al. | Sept. 8, 1903 |
| 1,424,669 | Neely | Aug. 1, 1922 |
| 2,424,014 | Bobeldyk | July 15, 1947 |
| 2,483,204 | Johnson et al. | Sept. 27, 1949 |

FOREIGN PATENTS

| Number | Country | Date |
|---|---|---|
| 403,144 | Germany | Sept. 23, 1924 |
| 562,241 | Germany | Oct. 22, 1932 |